(12) United States Patent
Akimoto et al.

(10) Patent No.: US 7,138,102 B2
(45) Date of Patent: Nov. 21, 2006

(54) METHOD FOR MANUFACTURING HIGHLY-CRYSTALLIZED DOUBLE OXIDE POWDER

(75) Inventors: Yuji Akimoto, Fukuoka (JP); Kazuro Nagashima, Ohnojo (JP); Yoshikazu Nageno, Fukuoka (JP); Hidenori Ieda, Dazaifu (JP); Naoko Tanaka, Tosu (JP)

(73) Assignee: Shoei Chemical Inc., Tokyo (JP)

( * ) Notice: Subject to any disclaimer, the term of this patent is extended or adjusted under 35 U.S.C. 154(b) by 487 days.

(21) Appl. No.: 10/611,720

(22) Filed: Jul. 1, 2003

(65) Prior Publication Data
US 2004/0009109 A1   Jan. 15, 2004

(30) Foreign Application Priority Data
Jul. 9, 2002  (JP) .............................. 2002-200425

(51) Int. Cl.
C01D 1/02    (2006.01)
C01F 17/00   (2006.01)
C01F 11/02   (2006.01)
C01G 1/00    (2006.01)

(52) U.S. Cl. .............. 423/593.1; 423/263; 423/594.16; 423/600; 423/599; 423/594.14; 423/594.8; 423/594.15; 423/598; 423/594.9; 423/594.7; 423/595; 423/594.1; 423/594.5; 423/594.3; 423/594.12; 423/594.13; 423/277; 423/304; 423/325

(58) Field of Classification Search ............. 423/593.1, 423/263, 594.16, 600, 599, 594.14, 594.8, 423/594.15, 598, 594.9, 594.2, 594.6, 594.4, 423/596, 594.7, 595, 594.1, 594.5, 594.3, 423/594.12, 594.13, 277, 304, 325
See application file for complete search history.

(56) References Cited

U.S. PATENT DOCUMENTS 5,958,361 A * 9/1999 Laine et al. ................. 423/610
5,958,362 A * 9/1999 Takatori et al. ........... 423/593.1
6,060,165 A * 5/2000 Asada et al. ................ 428/403
6,110,442 A * 8/2000 Xia et al. .................... 423/599
6,530,972 B1 * 3/2003 Akimoto et al. .............. 75/351
2003/0039607 A1 * 2/2003 Yanai et al. ................. 423/593

FOREIGN PATENT DOCUMENTS

| JP | 10-99694  | 4/1989  |
| JP | 6-115934  | 4/1994  |
| JP | 10-99694  | 4/1998  |
| JP | 10-182161 | 7/1998  |
| JP | 10-330118 | 12/1998 |

OTHER PUBLICATIONS

Shuwang, Y., et al., "Study on Ionic Sieve of Titanium Oxide and Lithium Recovery from Brines", *Ion Exchange and Absorption*, vol. 8, No. 3, 1992, pp. 222-228.

"Synthesis of Rare Earth Ultrafine Powders by Spray Pyrolysis (I) -Particle Morphology and Formation Mechanism of $Y_2O_3$ Powder" Zhao, Xinyu, Zhang, Yu, Gu, Hongchen, and Gao, Wei; Chemical Journal of Chinese Universities, vol. 19, No. 4, pp. 507-510 in Chinese, with an English Abstract.

* cited by examiner

*Primary Examiner*—Stanley S. Silverman
*Assistant Examiner*—Timothy C. Vanoy
(74) *Attorney, Agent, or Firm*—Flynn, Thiel, Boutell & Tanis, P.C.

(57) ABSTRACT

A method for manufacturing a highly-crystallized double oxide powder composed of a single crystal phase which can be used as a phosphor material, a dielectric material, a magnetic material, etc. The method involves forming fine droplets of a raw material solution containing a raw material compound that includes at least one metal element and/or at least one semi-metal element that constitutes a double oxide, and heating these droplets at a high temperature, wherein the raw material solution is a solution which exhibits only one main peak attributable to the decomposition reaction of the raw material compound or a reaction intermediate thereof in a DTA profile when the solution is dried and solidified and subjected to TG-DTA measurement.

5 Claims, 7 Drawing Sheets

METHOD FOR MANUFACTURING HIGHLY-CRYSTALLIZED DOUBLE OXIDE POWDER

BACKGROUND OF THE INVENTION

1. Field of the Invention

The present invention relates to a method for manufacturing a highly-crystallized double oxide powder comprising two or more metal elements and/or semi-metal elements, and more particularly relates to a method for manufacturing a highly-crystallized double oxide powder having a uniform particle size and a high purity and composed of a single crystal phase, which is useful as industrial materials in a variety of fields, including various functional materials used in electronics, such as phosphor materials, dielectric materials, magnetic materials, conductor materials, semiconductor materials, superconductor materials, piezo-electric materials, magnetic recording materials, secondary cell-use positive electrode materials, electromagnetic wave absorption materials, catalyst materials, etc.

2. Description of the Prior Art

Mechanical pulverization has been used in the past to manufacture a double oxide powder. This process involves mixing raw material powders, putting this mixture in a crucible or other such firing vessel and heating at a high temperature for an extended time to bring about a solid phase reaction, and then pulverizing this product in a ball mill or the like. The double oxide powder manufactured by this method, however, is an agglomerate of particles with an irregular particle shape and a broad particle size distribution, and a considerable amount of impurities come from the crucible. Furthermore, the treatment is inefficient because it has to be carried out at a high temperature for a long time in order to raise the homogeneity of the composition. In addition, the particles are often modified on their surface by the mechanical impact and chemical reactions to which they are subjected during the pulverization process, which means that many defects develop at the surface and in the interior of the powder, thereby leading to the lowering of crystallinity and the deterioration of the physical properties inherent in the double oxide.

A sol-gel process, hydrothermal process, co-precipitation, spray pyrolysis, and so forth are known methods for preventing the generation of a surface modification layer and obtaining a double oxide powder with high crystallinity. Still, a sol-gel process entails high raw material cost because it requires a high-purity raw material, while a hydrothermal process and co-precipitation both take a long time and have low yield per unit of time, so the manufacturing cost is high.

Spray pyrolysis is a known method for manufacturing a fine oxide powder, in which one or more metal compounds or semi-metal compounds are uniformly dissolved or dispersed in water or an organic solvent, this mixed solution is atomized in the form of fine droplets, these droplets are heated at a temperature higher than the decomposition temperature of the metal compounds and under conditions that will cause precipitation of metal oxides, and the metal compounds are pyrolyzed to produce metal oxide powder. This method makes it easy to obtain a fine spherical powder of uniform particle size, with high crystallinity and no agglomeration, by properly selecting the pyrolysis conditions. Also, since a solution of metal or semi-metal compounds is used as a raw material, advantages are that various metal components can be mixed in the desired ratio and uniformly at the ion level, inclusion of impurities is suppressed, and the particle size of the produced powder can be easily controlled by process control of the spray conditions and so forth. This method is therefore considered a good way to manufacture a double oxide powder, and has been used in the manufacture of a fine double oxide powder for oxide phosphors, oxide dielectrics, oxide magnetic bodies, oxides used for secondary cell positive electrodes, electromagnetic wave absorption materials, catalyst materials, etc.

Nevertheless, when a double oxide powder is manufactured by spray pyrolysis, the retention time of the atomized droplets in a reaction vessel is extremely short, generally lasting only 0.1 to 10 seconds, so in the manufacture of a double oxide with a high melting point, a double oxide with a high sintering reaction temperature, or a double oxide composed of metal elements with low sintering reactivity, the produced particles are not a single phase, and multiple crystal phases tend to be produced, or unreacted material tends to remain. Particularly when many metal compounds are used for the raw material, it is believed that the compounding reaction is impeded because the various components have different pyrolysis temperatures or sintering temperatures. This causes the powder that is produced to have a low crystallinity, or the particle surface may be porous or the particle may be cracked, and it is difficult to fully realize the physical properties inherent to the double oxide, among other problems. One of the problems encountered if the heating is carried out at a higher temperature in an effort to promote pyrolysis and compounding is that the desired crystal phase will not be obtained Meanwhile, complex polymerization is a known method for manufacturing a double oxide powder composed of a single crystal phase. With this method, a raw material compound including two or more metal elements that constitute the double oxide, a polyamino chelating agent or a hydroxycarboxylic acid such as citric acid, and a polyol such as ethylene glycol are mixed to produce an aqueous solution, which is heated at a specific temperature of at least 110° C. to bring about an esterification reaction and form a composite polymer of a metal complex in the solution, thereby forming a homogeneous precursor having a uniform element arrangement on the metal ion level. After this, as discussed in Japanese Patent Publication Nos. 6-115934A, 10-330118A, and 10-99694A, for example, powder of the composite polymer of the metal complex is separated, calcined and then fired at a high temperature to obtain a double oxide powder, or as discussed in Japanese Patent Publication No. 10-182161A, this composite polymer is dissolved in water and atomized into a high-temperature atmosphere and pyrolyzed to obtain a double oxide powder. This method, however, is complicated in that it requires a composite polymer of a metal complex to be synthesized prior to the pyrolysis step, and for this polymer to be separated or redissolved. It also requires a large amount of ethylene glycol or other co-precipitant or complexing agent, and the polycondensation reaction takes an extremely long time with a low yield, thereby resulting in a higher manufacturing cost. Furthermore, the homogeneity of the complex ions of the solution may not always be maintained in the removal of the solvent from the produced complex. Particularly when the polycondensation reaction is conducted by gradually removing the solvent over an extended period of time, any gel that is produced may redissolve and form salts with anions present in the solution, and these salts may precipitate and affect the composition, which means that homogeneity is lost.

In yet another known method, a double alkoxide, double salt, or the like of the metals that constitute the double oxide is synthesized ahead of time, and this is pyrolyzed, but this method also entails a complex procedure, the metals that can be used must be selected from a narrow range, and it is difficult to achieve homogeneity because of differences in the hydrolysis rates of the respective metal compounds, for example, and therefore a single phase of sufficient crystallinity is not obtained.

SUMMARY OF THE INVENTION

It is an object of the present invention to manufacture a highly-crystallized double oxide powder that has no inclusion of impurities, is highly dispersible, is composed of a single crystal phase, and has a uniform particle size, by a simple process at a low cost, and in particular to provide a manufacturing method suited to the manufacture of a functional metal double oxide powder, functional ceramic powder, or the like of which uniform composition and high crystallinity are required. It is another object of the present invention to provide a method with which a highly-crystallized double oxide powder that has a uniform particle size and a high purity, is highly dispersible and composed of a single crystal phase, can be obtained efficiently, in a single step, from a plurality of raw material compounds in the manufacture of a double oxide powder by the spray pyrolysis of a solution containing two or more metals or semimetal elements, and which determines the ideal raw material solution composition for this purpose.

The present invention is as follows.

1. A method for manufacturing a highly-crystallized double oxide powder composed of a single crystal phase by forming fine droplets of a raw material solution containing a raw material compound that includes at least one metal element and/or at least one semi-metal element that constitutes a double oxide, and heating these droplets at a high temperature, wherein the raw material solution is a solution which exhibits only one main peak attributable to the decomposition reaction of the raw material compound or a reaction intermediate thereof in a DTA profile when the solution is dried and solidified and subjected to TG-DTA measurement.

2. The method according to above item 1, wherein the main peak is present at a temperature range of 300 to 600° C.

3. The method according to above item 1 or 2, wherein a plurality of compounds, each including at least one metal element and/or at least one semi-metal element therein, is used as the raw material compound.

4. The method according to any of above items 1 to 3, wherein the raw material solution further includes a compound that reacts with the raw material compound to form a double salt, a complex, or a complex polymer.

5. The method according to above item 4, wherein the raw material solution includes the raw material compound, a hydroxycarboxylic acid and/or a polyamino chelating agent, and a polyol.

DETAILED DESCRIPTION OF THE PREFERRED EMBODIMENTS

The double oxide powder manufactured with the present invention is not particularly limited except that it is composed of oxygen and two or more elements selected from among metal elements and semi-metal elements (hereinafter referred to as "metal elements").

Examples include $SrAl_2O_4$:Eu, $(Sr,Ca)B_4O_7$:Eu, $Y_2SiO_5$:Ce, $BaMgAl_{14}O_{23}$:Eu, $BaMgAl_{10}O_{17}$:Eu, $BaAl_{12}O_{19}$:Mn, $Y_3Al_5O_{12}$:Ce, $Y_3Al_5O_{12}$:Tb, $ZnSiO_4$:Mn, $InBO_3$:Tb, $Y_2O3$:Eu, $InBO_4$:Eu, $YVO_4$:Eu, $Mg_2SiO_4$:Mn, $Zn_3(PO_4)_2$:Mn, $(Y,Gd)BO3$:Eu, $SrTiO_3$:Eu, ZnO—$LiGaO_2$, and other such phosphor materials; $BaTiO_3$, $SrTiO_3$, $Pb(Mg_{1/3}Nb_{2/3})O_3$, PZT, PLZT, and other such dielectric materials and piezoelectric materials; ferrite and other such magnetic materials; $Pb_2Ru_2O_6$, ITO, and other such conductor materials; $YBa_2Cu_3O_y$, and other such superconductor materials; $LiMn_2O_4$, $Li_3V_2(PO_4)_3$, $Li_3Fe_2(PO_4)_3$, $LiCoO_2$, $LiNiO_2$, $LiMn_2O_4$, $LaCoO_3$, $LaMnO_3$, and other such secondary cell positive electrode materials; $La_{1-x}Sr_{x+y}CrO_3$ and other such electrode materials for solid electrolyte fuel cells; and $BaTi_4O_9$, $Nb_6O_{17}$, $CuAlO_2$, and other such photocatalyst materials and photo-functional materials.

The present invention is characterized by a means for predicting the ideal composition of the raw material solution used to manufacture the intended highly-crystallized double oxide powder composed of a single crystal phase in a single step using spray pyrolysis. Specifically, when the raw material solution is prepared, the solution composition is so chosen that only one main peak attributable to the decomposition reaction of the raw material compound or a reaction intermediate thereof is present in a DTA profile when the solution is dried and solidified and subjected to TG-DTA measurement.

In more specific terms, part of the prepared raw material solution is taken out, heated, and dried to obtain a solidified sample, whose pyrolysis behavior is measured with a TG-DTA measurement apparatus. The heating and drying should be carried out at a temperature at which the solvent of the raw material solution will evaporate, leaving a dry solid. For instance, when water is used as the solvent, the solution is evaporated to dryness at a temperature between 50 and 100° C.

When the dry sample is subjected to TG-DTA measurement, a pyrolysis reaction is accompanied by the appearance of an exothermic or absorption peak. For example, when an organic compound is used as the raw material compound, an exothermic peak is observed that is attributable to the oxidative decomposition of the compound. On the other hand, there may be cases in which a reaction between raw material compounds or between the raw material compounds and a compound such as a complexing agent added to the raw material solution produces an intermediate, and an exothermic peak produced by the pyrolysis reaction of this intermediate appears. Research conducted by the inventors has revealed that when a DTA profile is prepared, and spray pyrolysis is performed on a raw material solution such that only one main peak is produced by the decomposition of the raw material compounds or reaction intermediates, the targeted double oxide powder is obtained, or more specifically, a fine double oxide powder that consists of a single crystal phase, is uniform in its composition (viewed microscopically), and has extremely high crystallinity of its particles.

When a raw material solution such as this is used, it is surmised that in the spray pyrolysis step, either a plurality of raw material compounds are simultaneously pyrolyzed in the individual droplets, or an intermediate of uniform composition on the elemental level, such as a single composite, a single complex, or a single complex polymer, is produced in the droplets prior to pyrolysis, and then these are instantly pyrolyzed. Accordingly, it is believed that the plurality of constituent metal elements do not become individual oxides or the like, but are compounded simultaneously with pyrolysis, which means that they are heated to an even higher temperature while the homogeneity of the composition is preserved, producing a double oxide of a single phase. Conversely, when there are a plurality of the above-mentioned main peaks, it is very likely that the metal components will be separately decomposed and precipitated during pyrolysis. When this happens, if heating at a high temperature is subsequently performed, the compositional homogenization will proceed, but because the heating time is so short in a spray pyrolysis process, it seems that the solid phase reaction does not bring about enough movement and diffusion of the atoms, and as a result the homogeneity and crystallinity are inferior and a single phase tends not be obtained.

Therefore, whether or not an intermediate is involved, this method makes it possible to predict whether a single crystal phase will result prior to the spray pyrolysis step, and to predetermine the solution composition that will yield a highly-crystallized double oxide powder of a single crystal phase.

If a solvent or other additive or an organic component that does not react with the raw material compounds remains in the solidified product, peaks originating in the combustion of these compounds may appear in a relatively low temperature region. Such peaks attributable to the decomposition of residual organic components can be readily distinguished from peak attributable to the decomposition of the raw material compounds or reaction intermediates thereof based on the TG profiles and the composition of the raw material solution. In the present invention, the former peaks are neglected to find the main peaks. That is, the raw material solution exhibiting just one main peak attributable to the decomposition reaction of the raw material compounds or reaction intermediates thereof is used. One that exhibits a single main peak at a temperature between 300 and 600° C. is particularly favorable. If the main peak is positioned too far to the high temperature side, decomposition will be slow in the spray pyrolysis step, and decomposition of the organic matter will be incomplete, so carbon will remain behind and hinder the reaction, resulting in an oxygen deficiency.

The metal elements that serve as the constituent components of the double oxide in the present invention may be, for example, alkali metals, alkaline earth metals, typical metal elements such as Al, Ga, Ge, In, Sn, Sb, Tl, Pb, and Bi, transition metal elements such as Ti, V, Cr, Mn, Fe, Co, Ni, Cu, Zn, Zr, Nb, Mo, Hf, Ta, and W, lanthanum series rare earth metal elements such as La, Y, Gd, Eu, Tb, Sm, Pr, Ce, and Yb, semi-metal elements such as P, Si, and B, and so forth, although they are not limited to these elements. The raw material compounds are suitably selected from among oxides, hydroxides, nitrates, sulfates, carbonates, halides, ammonium salts, aluminates, oxynitrates, oxysulfates, ammonium complexes, acetylacetonates, carboxylates, resinates, alkoxides, amide compounds, imide compounds, and other such inorganic or organic compounds of metal elements. Double salts or complex salts of these may also be used. If the metal element is boron, silicon, phosphorus, or another such semi-metal element, then boric acid, phosphoric acid, silicic acid, borates, phosphates, silicates, and so forth may also be used.

The raw material compounds are dissolved in a solvent in specific proportions to prepare the raw material solution. The solvent can be water, an organic solvent such as an alcohol, acetone, or ether, or a mixture of these. Not all of the raw material compounds need to be completely dissolved as long as they are uniformly present in the droplets. For instance, the raw material compounds may be uniformly dispersed in the form of oxide colloids in a solution in which the other compounds have been dissolved. The term "solution" as used in the present invention encompasses such a dispersion.

When a plurality of compounds, each of which comprises one metal element or a mixture of two or more metal elements, are used as the raw material compound, in order to prepare a raw material solution with just one main peak as discussed above, the raw material solution should be prepared by a method in which compounds having pyrolysis temperatures close to each other are used, a plurality of raw material compounds which react with each other to form a single composite in the solution are used, or a further compound capable of forming a double salt, complex, or complex polymer through reaction with a plurality of the raw material compounds is added, for example. Compounds capable of forming a double salt, complex, or complex polymer include alkalies, carboxylic acids such as oxalic acid and citric acid, polyvinyl alcohol, polyols, and ammonium salts. The addition of an organic complexing agent is particularly effective when an inorganic compound is used as the raw material compound.

Preferably, the raw material solution is prepared by adding and mixing a polyamino chelating agent and/or a hydroxycarboxylic acid capable of forming a complex with the raw material compound, and a polyol (used as a crosslinking agent). If this raw material solution exhibits a single main peak, it is surmised that in the spray pyrolysis step, an extremely homogeneous and single-phase double oxide powder is produced through a continuous series of steps comprising the formation of a metal complex by reaction of the raw material compound and the hydroxycarboxylic acid and so forth in each droplet, followed by esterification, dehydration, composite polymerization, and the production and sintering of a double oxide by the pyrolysis of a composite polymer of a metal complex. Therefore, with the present invention, the starting raw materials need only be a mixed solution of the raw material compound, a hydroxycarboxylic acid or other complexing agent, and a polyol, and there is no need to synthesize a composite polymer of a metal complex in advance. Furthermore, since the series of reactions occurs continuously over an extremely short residence time within a heating vessel, there is no loss of homogeneity of the composite polymer as a result of time-consuming solvent removal and gellation as with a conventional complex polymerization method.

Examples of hydroxycarboxylic acids that can be used include citric acid, malic acid, tartaric acid, mesotartaric acid, meconic acid, glyceric acid, hydroxybutyric acid, lactic acid, glycolic acid, and hydracrylic acid. Examples of favorable polyamino chelating agents include ethylenediaminetetraacetic acid, trans-1,2-cyclohexanediaminetetraacetic acid, glycol ether diaminetetraacetic acid, diethylenetriaminepentaacetic acid, triethylenetetraminehexaacetic acid, nitrilotriacetic acid, tetraethylenepentamineheptaacetic acid, N-(2-hydroxyethyl)-ethylenediamine-N,N',N'-triacetic acid, ethylenediamine-N,N,N',N'-tetrapropionic acid, diethylenetriamine, and triethylenetetramine. Examples of polyols that can be used include ethylene glycol, propylene glycol, trimethylene glycol, diethylene glycol, dipropylene glycol, polyethylene glycol, polypropylene glycol, triglycol, tetraethylene glycol, octylene glycol, butanediol-1,4-hexylene glycol, 1,4-butanediol, 1,5-pentanediol, 1,6-hexanediol, and other such glycols, glycerols, and other polyhydric alcohols.

The raw material solution is formed into fine droplets with an ultrasonic atomizer, a two-fluid nozzle type or other type atomizer, or using another such atomizing means, then the droplets are heated and pyrolyzed at a high temperature. The heating step here may be the same as in an ordinary spray pyrolysis method. For example, the droplets are supplied at a constant flow rate along with a carrier gas into a vessel heated to a high temperature by an electric furnace or the like and passed through the vessel in a short time. In this heating step, the droplets may first be dried at a low temperature, then supplied to a high temperature area for pyrolysis. The composition usually tends to vary with a process such as this because the heating rate of the droplets is so slow, but the heating rate has no effect when the raw material solution of the present invention is used.

The droplets are heated at a temperature high enough for the raw material compound to completely decompose and produce a double oxide. This is usually about 700 to 1800° C. The optimal heating temperature will vary with the composition and intended application of the double oxide powder, and with the required degree of crystallinity, sphericity, heat resistance, and other such characteristics, so this temperature should be determined as dictated by the intended purpose. For instance, about 1200 to 1700° C. is favorable with an oxide phosphor, while about 700 to 900° C. is best with an oxide electrode material with low heat resistance for use in batteries. To obtain a highly-crystallized or single-crystal double oxide powder with a uniform particle shape, it is generally favorable for the pyrolysis to be performed at a temperature near or above the melting point of the targeted double oxide. For example, to obtain a ferrite highly-crystallized spherical powder, the pyrolysis must be performed at a temperature of at least 1200° C.

The atmosphere used during pyrolysis is suitably selected from among oxidizing, reducing, and inert atmospheres, according to the targeted double oxide.

If desired, the fine double oxide powder thus obtained may also be annealed. In the case of a phosphor, for example, this heat treatment is performed between 400 and 1800° C. It is believed that this heat treatment increases crystallinity and controls the valence of an activator, and therefore increases fluorescence intensity and allows the afterglow persistence and emission color to be controlled. The powder obtained with the present invention has high crystallinity in its particles and the homogeneity of the composition is maintained, so even if annealing is performed at high temperature, the particles will not readily agglomerate due to sintering.

The present invention will now be described in more specific terms through examples and comparative examples.

EXAMPLE 1

$Y_2O_3:Eu^{3+}$ Phosphor

Figure 1:
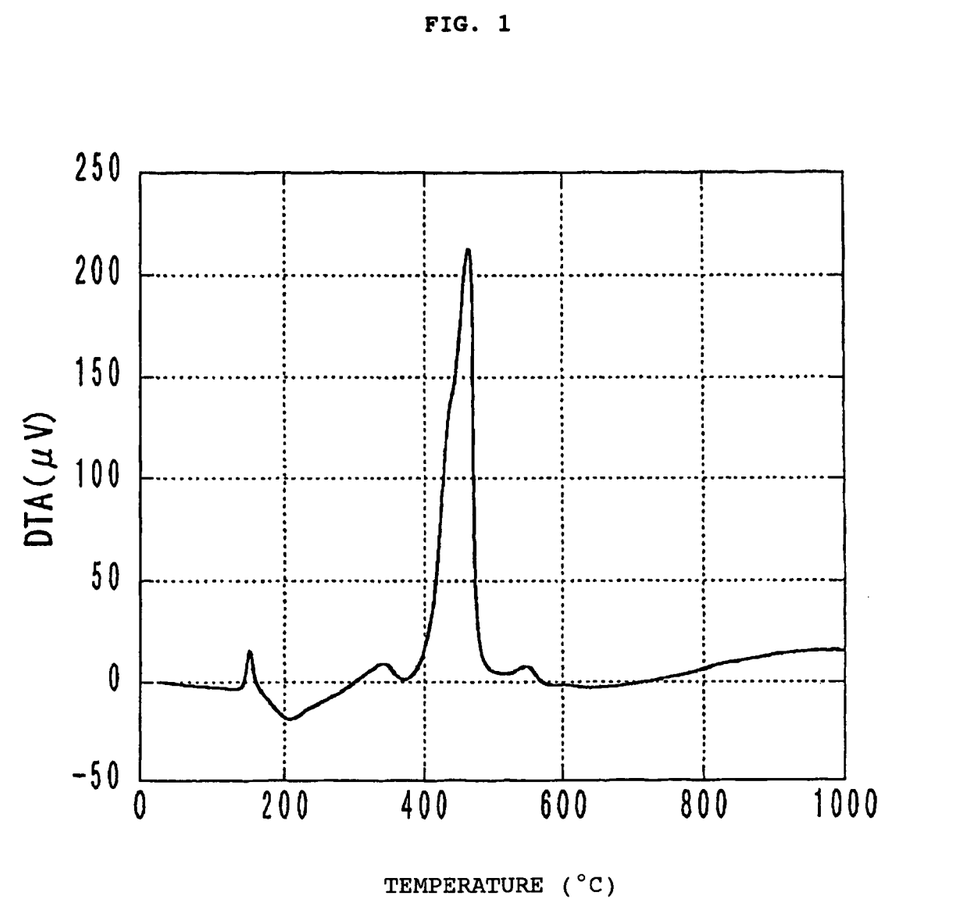
FIG. 1 is the DTA profile of a sample obtained by drying and solidifying the raw material solution of Example 1.

A raw material solution was prepared by dissolving 112.1 g of yttrium nitrate, 7.0 g of europium nitrate, 130.8 g of citric acid, and 38.6 g of monoethylene glycol in 1000 mL (milliliters) of deionized water so that the molar ratio of the raw materials would be 0.95:0.05:2:2. 10 mL of this raw material solution was taken out and dried at 100° C., and the solidified sample was subjected to TG-DTA measurement. The DTA profile is shown in FIG. 1. It can be seen from this DTA profile that the main peak is a single strong, sharp exothermic peak in the vicinity of 465° C. There is a weak, broad exothermic peak in the vicinity of 150° C., but analysis by X-ray diffraction revealed this to be due to decomposition of the citric acid.

Fine droplets were produced from this raw material solution using an ultrasonic atomizer, and these were supplied, using air as a carrier gas, to a ceramic tube heated to 1600° C. by an electric furnace. The droplets were pyrolyzed as they passed through the heating zone, producing a white powder.

The powder thus obtained was analyzed by an X-ray diffractometer, which revealed it to be a double oxide powder composed of a single crystal phase expressed by $Y_{0.95}Eu_{0.05}O_3$, having good crystallinity and a half-value width of 0.151 degree in the main peak (222) plane. Observation by a scanning electron microscope (SEM) revealed that this powder consisted of spherical particles with no agglomeration, with an average particle size of 1.0 μm, a minimum size of 0.5 μm, and a maximum size of 2.2 μm. The fluorescence spectrum produced by ultraviolet excitation was measured, whereupon a high fluorescence intensity was obtained. The emitted color was red. Table 1 shows the characteristics of the obtained powder.

COMPARATIVE EXAMPLE 1

A phosphor powder was manufactured in the same manner as in Example 1, except that the molar ratio of the yttrium nitrate, europium nitrate, citric acid, and monoethylene glycol in the raw material solution was changed to 0.95:0.05:2:1.

Figure 2:
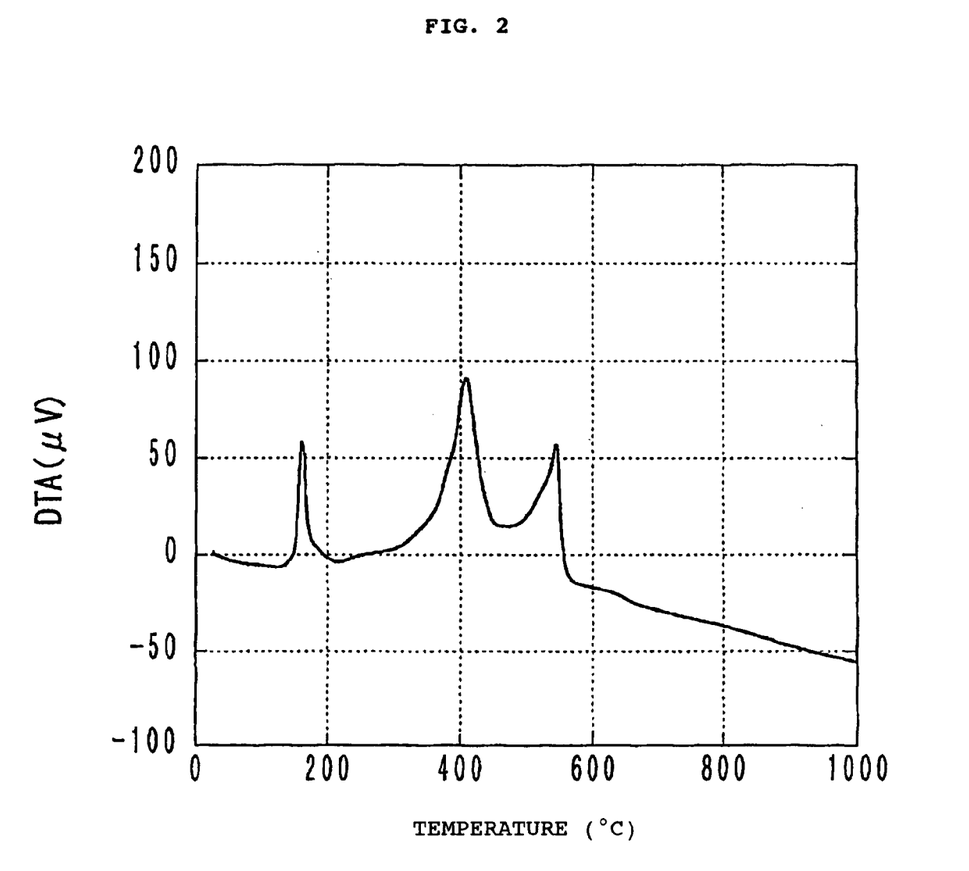
FIG. 2 is the DTA profile of a sample obtained by drying and solidifying the raw material solution of Comparative Example 1.

FIG. 2 shows the DTA profile obtained by TG-DTA measurement of the solidified sample of the raw material solution. It can be seen from FIG. 2 that two completely split exothermic peaks are present as main peaks in the vicinity of 410° C. and 545° C. Compared to the powder of Example 1, the powder obtained here had a wider particle size distribution and lower crystallinity. The characteristics are shown in Table 1. The fluorescence intensity is the relative intensity when the powder of Example 1 is used as a base of 100.

COMPARATIVE EXAMPLE 2

A phosphor powder was manufactured in the same manner as in Example 1, except that no monoethylene glycol was used and the molar ratio of the yttrium nitrate, europium nitrate, and citric acid in the raw material solution was changed to 0.95:0.05:2.

Figure 3:
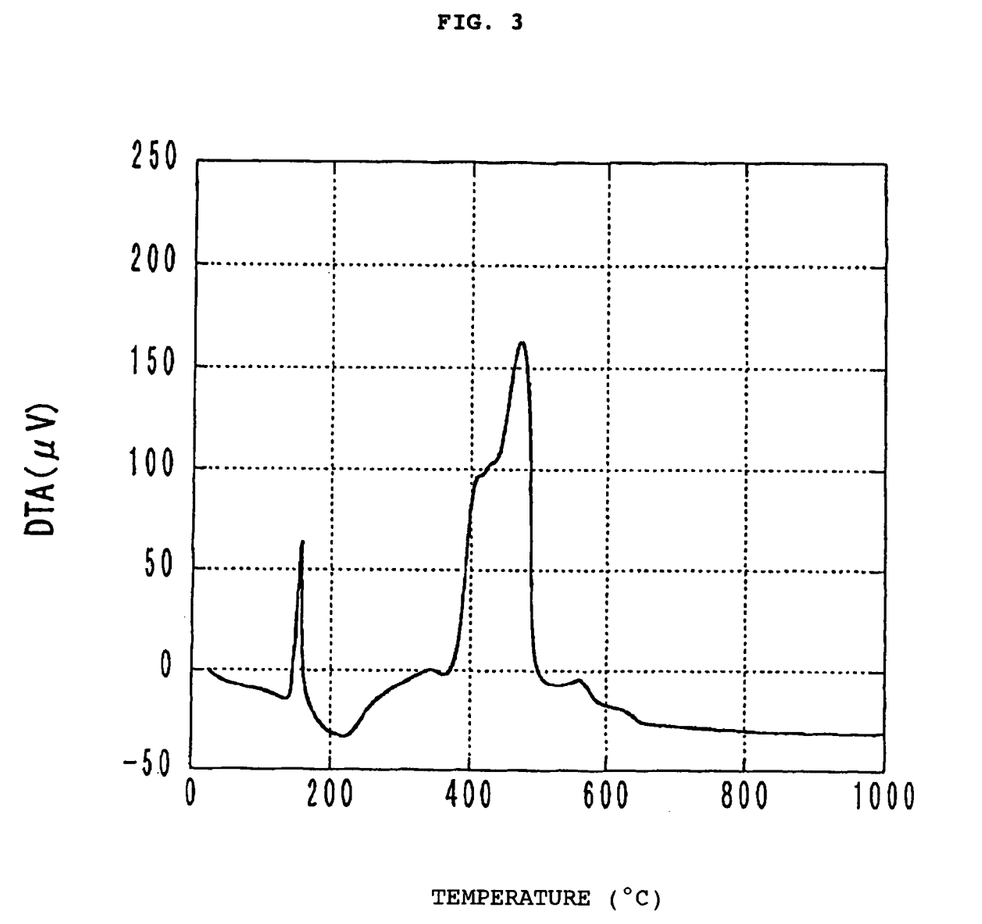
FIG. 3 is the DTA profile of a sample obtained by drying and solidifying the raw material solution of Comparative Example 2.

FIG. 3 shows the DTA profile of the raw material solution. It can be seen from FIG. 3 that two exothermic peaks with overlapping skirts are present between 400 and 500° C. The characteristics of this powder are shown in Table 1.

COMPARATIVE EXAMPLE 3

A phosphor powder was manufactured in the same manner as in Example 1, using a raw material solution obtained by dissolving yttrium nitrate and europium nitrate in deionized water so that the molar ratio of the raw materials would be 0.95:0.05, and containing no citric acid or monoethylene glycol.

Figure 4:
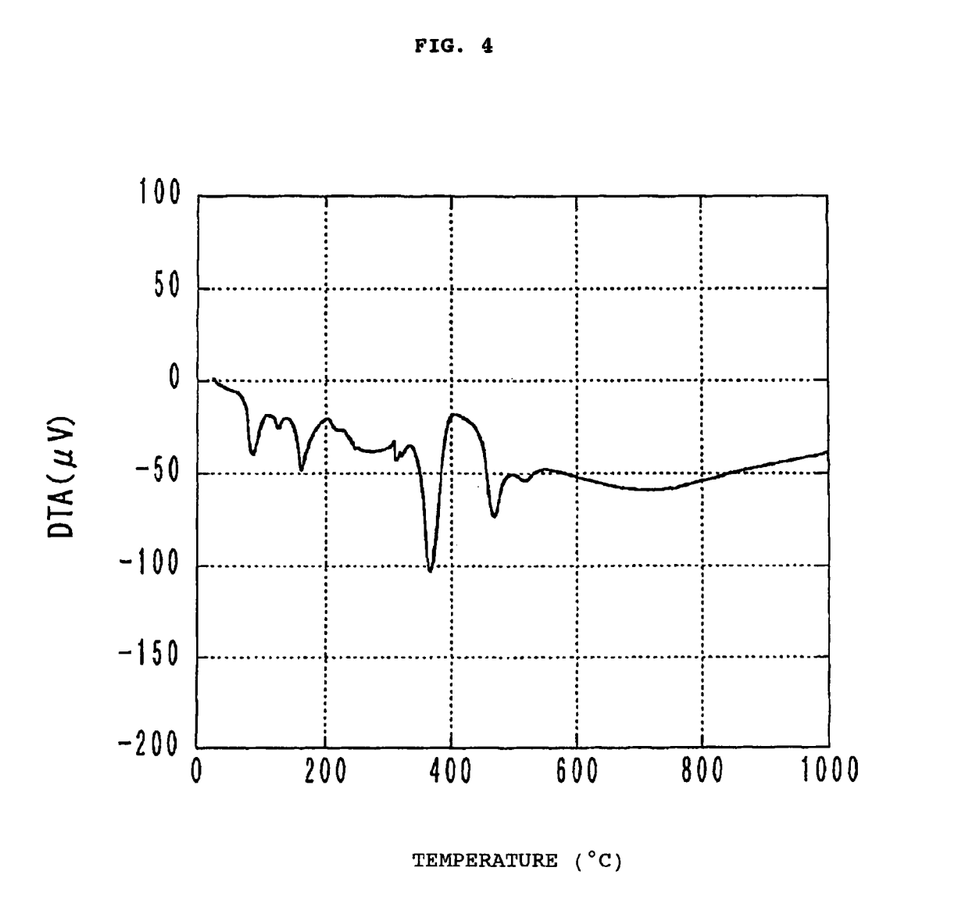
FIG. 4 is the DTA profile of a sample obtained by drying and solidifying the raw material solution of Comparative Example 3.

FIG. 4 shows the DTA profile of the solidified sample of the raw material solution. It can be seen from FIG. 4 that two exothermic peaks are present as main peaks. The powder characteristics are shown in Table 1.

TABLE 1

| | No. of DTA main peaks | Crystal phase | Half-value width (deg.) | Particle size (μm) Min. | Particle size (μm) Max. | Fluorescence intensity |
|---|---|---|---|---|---|---|
| Example 1 | 1 (exothermic) | $Y_{0.95}Eu_{0.05}O_3$ | 0.151 | 0.5 | 2.2 | 100 |
| Comp. Ex. 1 | 2 (exothermic) | $Y_{0.95}Eu_{0.05}O_3$ | 0.178 | 1.0 | 6.0 | 80 |
| Comp. Ex. 2 | 2 (exothermic) | $Y_{0.95}Eu_{0.05}O_3$ | 0.154 | 0.8 | 4.0 | 85 |
| Comp. Ex. 3 | 2 (endothermic) | $Y_{0.95}Eu_{0.05}O_3$ | 0.192 | 1.0 | 6.0 | 68 |

Example 2

$Y_2SiO_5:Tb^{3+}$ Phosphor

Figure 5:
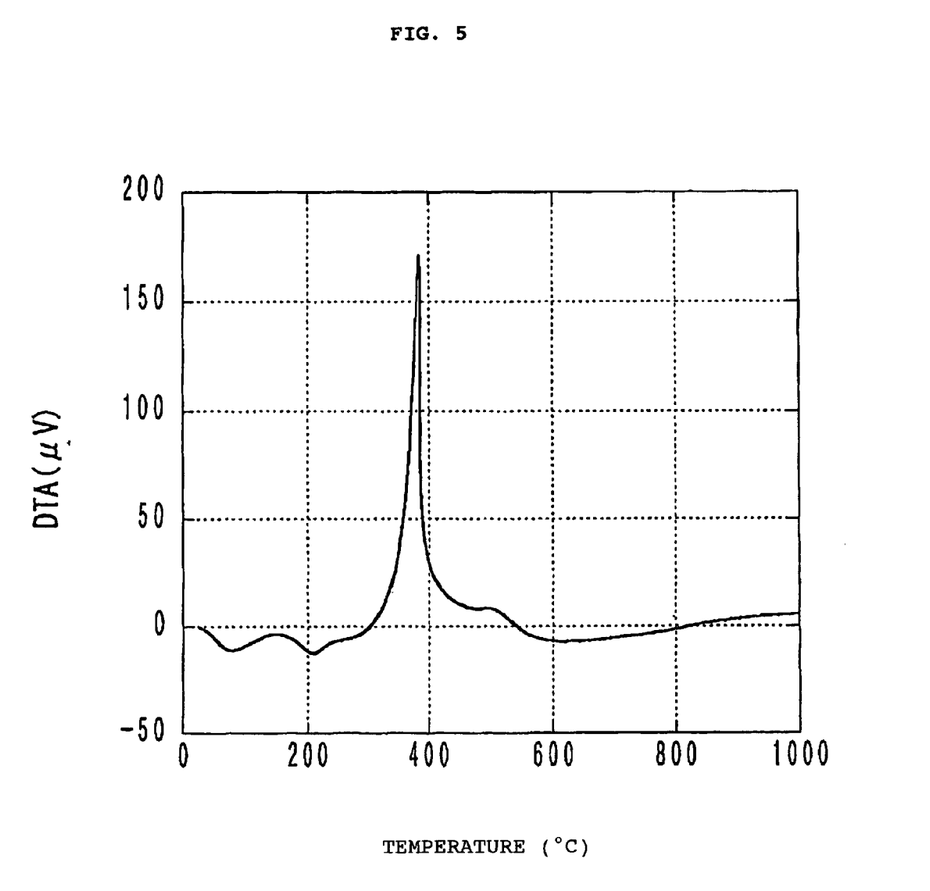
FIG. 5 is the DTA profile of a sample obtained by drying and solidifying the raw material solution of Example 2.

A raw material solution was prepared by dissolving 48.5 g of yttrium nitrate, 3.02 g of terbium nitrate, 14.6 g of ethyl orthosilicate, 75.1 g of citric acid, and 22.1 g of monoethylene glycol in 1000 mL of deionized water so that the molar ratio of the raw materials would be 1.9:0.1:1.0:5.3:5.3. 10 mL of this raw material solution was taken out and dried at 100° C., and the solidified sample was subjected to TG-DTA measurement. The DTA profile is shown in FIG. 5. It can be seen from FIG. 5 that just one sharp exothermic peak thought to be the result of decomposition of a reaction intermediate of raw material compounds is present in the vicinity of 380° C.

Fine droplets were produced from this raw material solution using an ultrasonic atomizer, and these were supplied, using air as a carrier gas, to a ceramic tube heated to 1600° C. by an electric furnace. The droplets were pyrolyzed as they passed through the heating zone, producing a white powder.

The powder thus obtained was a fine spherical powder with a narrow particle size distribution. The result of X-ray diffraction revealed this powder to be composed of just a $Y_{1.9}Tb_{0.1}SiO_5$ phase (low temperature phase), having high crystallinity. This powder was annealed for 2 hours in a horizontal tubular furnace set to 1300° C. in an air atmosphere for the purpose of increasing the fluorescence intensity, which yielded a phosphor powder composed of just a $Y_{1.9}Tb_{0.1}SiO_5$ phase (high temperature phase). Table 2 shows the characteristics of the obtained powder after annealing. The emitted color was green.

COMPARATIVE EXAMPLE 4

Figure 6:
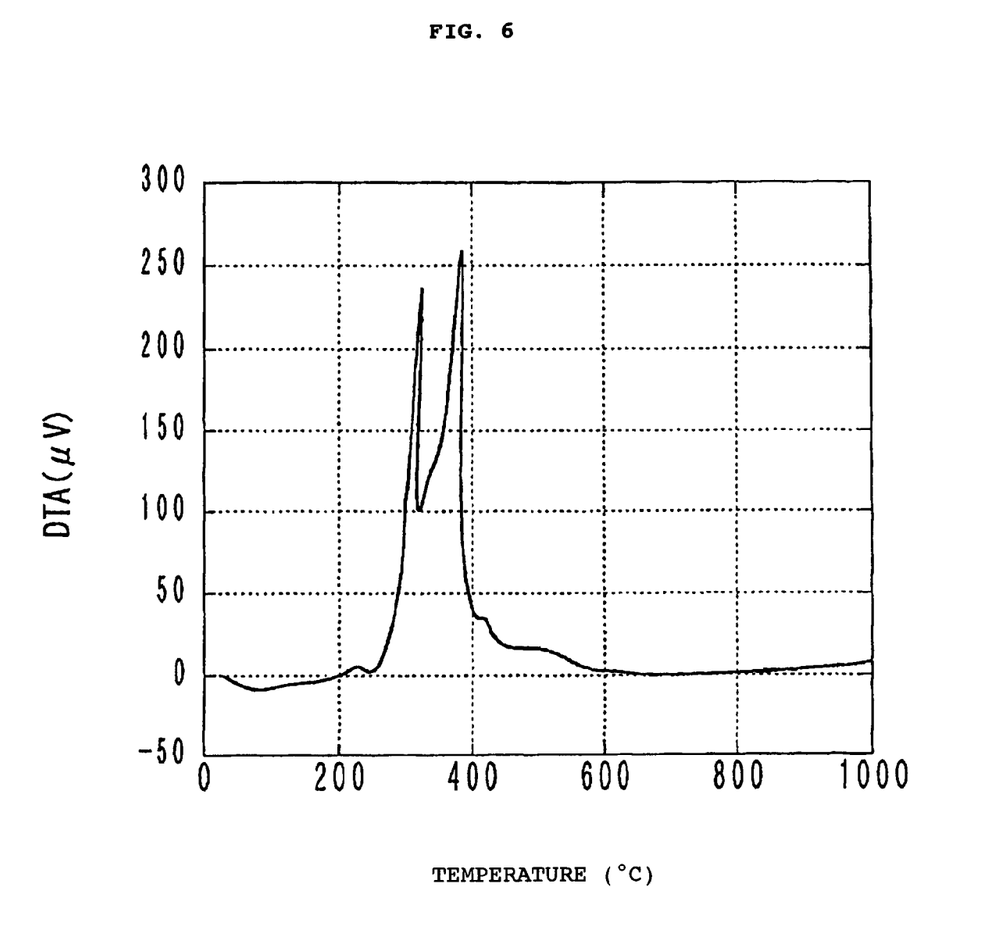
FIG. 6 is the DTA profile of a sample obtained by drying and solidifying the raw material solution of Comparative Example 4.

A phosphor powder was manufactured in the same manner as in Example 2, except that the molar ratio of the yttrium nitrate, terbium nitrate, ethyl orthosilicate, citric acid, and monoethylene glycol in the raw material solution was changed to 1.9:0.1:1.0:1.0:1.0. As shown in FIG. 6, TG-DTA measurement of the solidified sample of the raw material solution confirmed the presence of two exothermic peaks with overlapping skirts.

The X-ray diffraction of the obtained powder identified two phases, namely, a $Y_{1.9}Tb_{0.1}O_3$ phase and a $Y_{1.9}Tb_{0.1}SiO_5$ phase (low temperature phase). The $Y_{1.9}Tb_{0.1}O_3$ phase remained even after annealing, and the obtained powder was composed of two phases, including the $Y_{1.9}Tb_{0.1}SiO_5$ phase (high temperature phase). Table 2 shows the characteristics of the obtained powder after annealing. Compared to the powder of Example 2, the powder obtained here had a wider particle size distribution and lower crystallinity. The fluorescence intensity is the relative intensity when the powder of Example 2 is used as a base of 100.

COMPARATIVE EXAMPLE 5

Figure 7:
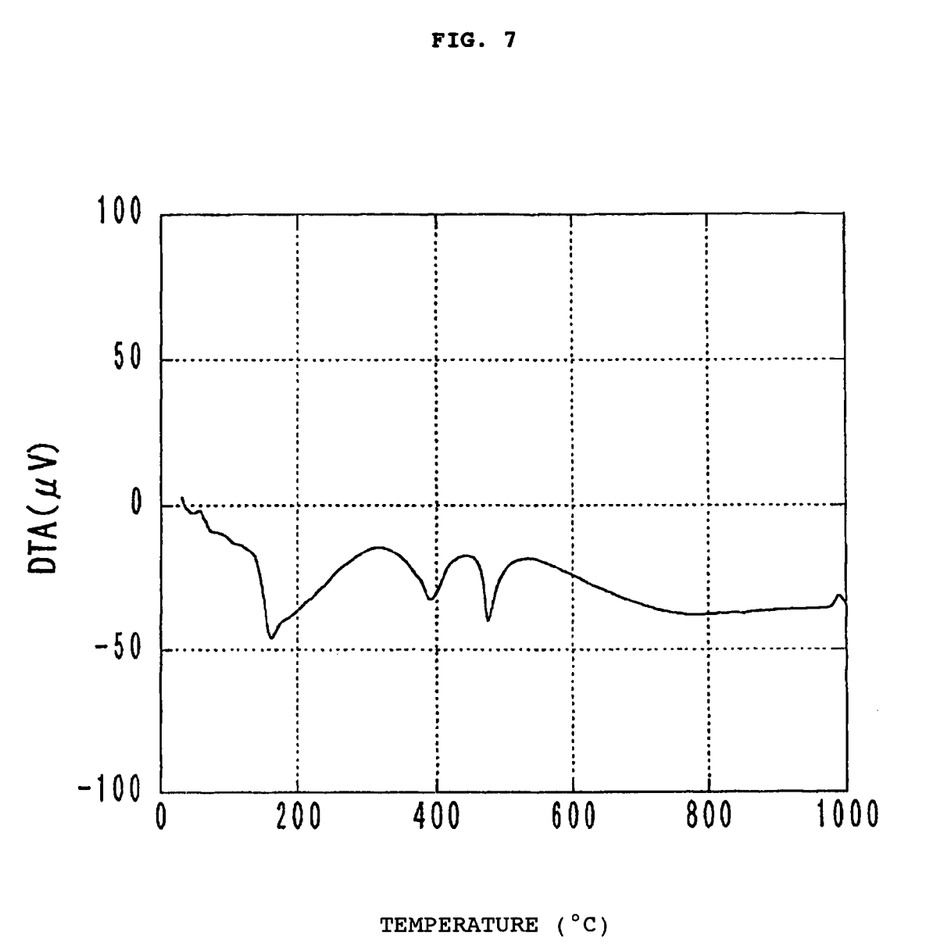
FIG. 7 is the DTA profile of a sample obtained by drying and solidifying the raw material solution of Comparative Example 5.

A double oxide powder was prepared in the same manner as in Example 2, except that a water-soluble silica sol was used in place of the ethyl orthosilicate as the silicon raw material, and the yttrium nitrate, terbium nitrate, and silica sol were used in a molar ratio of 1.9:0.1:1.0. The DTA profile obtained by TG-DTA measurement of the solidified sample of the raw material solution is shown in FIG. 7. It can be seen that there is no exothermic peak, and the main peaks comprise three endothermic peaks.

The X-ray diffraction of the obtained powder identified two phases, namely, a $Y_{1.9}Tb_{0.1}O_3$ phase and a $Y_{1.9}Tb_{0.1}SiO_5$ phase. Table 2 shows the characteristics of the obtained powder after annealing. The SEM observation revealed the particle surface to be porous, the particle size distribution to be wide, and the crystallinity of the particles to be low.

TABLE 2

| | No. of DTA main peaks | Crystal phase | Particle size (μm) Min. | Particle size (μm) Max. | Fluorescence intensity (after annealing) |
|---|---|---|---|---|---|
| Example 2 | 1 (exothermic) | $Y_{1.9}Tb_{0.1}SiO_5$ | 0.5 | 2.0 | 100 |
| Comp. Ex. 4 | 2 (exothermic) | $Y_{1.9}Tb_{0.1}SiO_3$, $Y_{1.9}Tb_{0.1}SiO_5$ | 0.8 | 3.5 | 80 |
| Comp. Ex. 5 | 3 (endothermic) | $Y_{1.9}Tb_{0.1}SiO_3$, $Y_{1.9}Tb_{0.1}SiO_5$ | 1.0 | 8.0 | 75 |

With the present invention, a fine powder of various double oxides composed of a single crystal phase and having a uniform composition can be manufactured with ease. The obtained powder will contain few inclusions of impurities, have a microscopically uniform composition, and have a high crystallinity, so the inherent functionality and physical properties of the double oxide can be fully realized. This is particularly favorable in the manufacture of phosphor materials, dielectric materials, magnetic materials, conductor materials, semiconductor materials, superconductor materials, piezoelectric materials, magnetic recording materials, secondary celluse positive electrode materials, electromagnetic wave absorption materials, catalyst materials, and other such functional double oxides that require a uniform composition as well as a uniform shape and particle size, high crystallinity and few crystal defects, a controlled crystal phase, and so forth. Of these, with rare earth ion activated phosphor materials, it used to be difficult to disperse activation ions to a high degree of uniformity, but the dispersion state of an activator will be extremely good in an oxide phosphor material obtained by the present method, with no segregation.

Also, a powder produced by the present method will be highly dispersible, with a uniform particle size distribution ranging from no more than 0.1 μm to about 20 μm in average particle size. A powder of the desired particle size can be easily manufactured by process control of the atomizing conditions, heating conditions, and so forth, and crystallinity can also be easily controlled. Furthermore, there is no need for a time-consuming and complicated step in which a complex or complex polymer is produced and separated ahead of time, and redissolved or redispersed in a solvent, as was necessary in the past. Instead, the desired double oxide powder can be manufactured with good productivity in a single, simple step.

Moreover, with the present invention, it is easy to ascertain the ideal raw material solution composition for manufacturing a highly-crystallized double oxide powder with a uniform particle size, high purity and high dispersibility and consisting of a single crystal phase by spray pyrolysis. In addition, it can be predicted whether it will be possible to manufacture the desired double oxide powder from a small amount of raw material solution, so a raw material solution suited to spray pyrolysis can be prepared more efficiently.

What is claimed is:

1. A method for manufacturing a highly-crystallized double oxide powder composed of a single crystal phase, comprising the steps of:

forming a raw material solution containing a raw material compound that includes at least two elements selected from at least one metal element and at least one semimetal element that constitute a double oxide;

subjecting a dried sample of the raw material solution to TG-DTA analysis to determine if only one main peak is produced by a decomposition reaction of the raw material compound or a reaction intermediate thereof and, if the TG-DTA analysis indicates that only one main peak is produced;

forming droplets of the raw material solution; and heating the droplets at a temperature sufficient to produce the double oxide powder.

2. The method according to claim 1, wherein the main peak is present at a temperature range of 300 to 600° C.

3. The method according to claim 1, wherein a plurality of compounds, each including at least one metal element and/or at least one semi-metal element therein, is used as the raw material compound.

4. The method according to claim 1, wherein the raw material solution further includes a compound that reacts with the raw material compound to form a double salt, a complex, or a complex polymer.

5. The method according to claim 4, wherein the raw material solution includes the raw material compound, a hydroxycarboxylic acid and/or a polyamino chelating agent, and a polyol.

* * * * *